United States Patent [19]

Sheller

[11] Patent Number: 5,632,961
[45] Date of Patent: May 27, 1997

[54] REINFORCING WEB FOR A MULTICELLULAR CONVERTER

[75] Inventor: David T. Sheller, Garrettsville, Ohio

[73] Assignee: W. R. Grace & Co.-Conn., New York, N.Y.

[21] Appl. No.: 461,918

[22] Filed: Jun. 5, 1995

Related U.S. Application Data

[63] Continuation of Ser. No. 370,643, Jan. 10, 1995, abandoned.

[51] Int. Cl.$^6$ .............................. B01D 53/34; F01N 3/10
[52] U.S. Cl. .................... 422/180; 422/177; 422/211; 422/222; 60/299; 502/439; 502/527; 428/116; 428/593
[58] Field of Search ........................ 422/171, 177, 422/179, 180, 211, 222, 221; 60/274, 299; 502/439, 527; 29/890; 428/593, 116, 119

[56] References Cited

U.S. PATENT DOCUMENTS

| | | | |
|---|---|---|---|
| 3,768,982 | 10/1973 | Kitzner et al. | 422/174 |
| 3,770,389 | 11/1973 | Kitzner et al. | 422/174 |
| 3,795,524 | 3/1974 | Sowman | 106/65 |
| 3,916,057 | 10/1975 | Hatch et al. | 428/236 |
| 4,381,590 | 5/1983 | Nonnenmann et al. | 29/890 |
| 4,414,023 | 11/1983 | Aggen et al. | 75/124 |
| 4,671,931 | 6/1987 | Herchenroeder et al. | 420/445 |
| 4,711,009 | 12/1987 | Cornelison et al. | 29/890 |
| 4,810,588 | 3/1989 | Bullock et al. | 428/603 |
| 5,055,275 | 10/1991 | Kannainen et al. | 422/180 |
| 5,070,694 | 12/1991 | Whittenberger | 60/300 |
| 5,125,231 | 6/1992 | Patil et al. | 60/274 |
| 5,130,100 | 7/1992 | Serizawa | 422/180 |
| 5,146,743 | 9/1992 | Maus et al. | 60/274 |
| 5,232,671 | 8/1993 | Brunson et al. | 422/180 |
| 5,366,700 | 11/1994 | Humpolik et al. | 422/177 |

FOREIGN PATENT DOCUMENTS

| | | | |
|---|---|---|---|
| WO89/10470 | 11/1989 | WIPO | F01N 3/20 |
| WO89/10471 | 11/1989 | WIPO | F01N 3/20 |
| WO90/12951 | 11/1990 | WIPO | F01N 3/28 |
| WO92/13636 | 8/1992 | WIPO | B01J 35/04 |

OTHER PUBLICATIONS

German 4,102,890 A1 dated Aug. 6, 1992.
European Appln 0 245 736 A1 May 4, 1987.
SAE Paper #890799 "Resistive Materials Applied to Quick Light-Off Catalysts" Hellman et al, Feb. 27–Mar. 3, 1989.

*Primary Examiner*—Robert J. Warden
*Assistant Examiner*—Hien Tran
*Attorney, Agent, or Firm*—Beverly J. Artale

[57] ABSTRACT

There has been provided an improved reinforcing web for multicellular honeycomb converter core bodies. The reinforcing web contains at least one flat thin metal strip to which is secured at least one corrugated thin metal strip as by brazing or welding. The reinforcing web is located centrally of the core body and gives the converter bodies hereof sufficient axial strength to survive the severe durability tests imposed by the automotive manufacturers.

15 Claims, 4 Drawing Sheets

REINFORCING WEB FOR A MULTICELLULAR CONVERTER

This is a continuation of application Ser. No. 08/370,643, filed Jan. 10, 1995 now abandoned.

This invention relates to a reinforcing web for a multicellular honeycomb converter formed of thin metal strips which is adapted to improve the durability of the converter in use and under severe testing. The converters hereof are principally those which are used in the conversion of pollutant materials contained in the exhaust from internal combustion engines and from gas turbine engines. Such converters in use are exposed to high temperatures, corrosive gases, and heavy vibration and pulsing. To prevent failure of the converter under such conditions, reinforcing means of the type described herein to improve mechanical strength have been found expecially useful.

BACKGROUND OF THE INVENTION AND PRIOR ART

This invention will be described in connection with embodiments especially adapted for use in exhaust lines from various types of engines, e.g., internal combustion engines of the spark ignited or compression ignited types, stationary or mobile, or gas turbines. It will be understood that the converters of the present invention may be used to effect various chemical reactions, particularly those occurring in fluid streams, especially gas streams, and which reactions are catalyzed or uncatalyzed.

Catalytic converters containing a corrugated thin metal (stainless steel) monolith have been known since the early 1970's. See Kitzner U.S. Pat. Nos. 3,768,982 and 3,770,389 each dated 30 Oct. 1973. More recently, corrugated thin metal monoliths have been disclosed in U.S. Pat. No. 4,711,009 dated 8 Dec. 1987 to Cornelison et al which discloses a process for making precoated corrugated thin metal strips in a continuous manner, and accordion folding them into predetermined shapes; U.S. Pat. No. 4,152,302 dated 1 May 1979, U.S. Pat. No. 4,273,681 dated 16 Jun. 1981, U.S. Pat. No. 4,282,186 dated 4 Aug. 1981, U.S. Pat. No. 4,381,590 dated 3 May 1983, U.S. Pat. No. 4,400,860 dated 30 Aug. 1983, U.S. Pat. No. 4,159,120 dated 28 May 1985, U.S. Pat. No. 4,521,947 dated 11 Jun. 1985, U.S. Pat. No. 4,647,435 dated 3 Mar. 1987, U.S. Pat. No. 4,665,051 dated 12 May 1987 all to Nonnenmann alone or with another and which disclose multicellular honeycomb converters with corrugated and flat thin metal strips all brazed together; U.S. Pat. No. 5,070,694 dated 10 Dec. 1991 to Whittenberger which discloses spirally wound converters with corrugated strips and flat strips. International PCT Publication WO 90/12951 published 9 Apr. 1990 seeks to improve axial strength by form locking layers of insulated plates. Another reference which seeks to improve axial strength is U.S. Pat. No. 5,055,275 dated 8 Oct. 1991 to Kannainian et al. Reference may also be had to international PCT Publication No. 92/13626 filed 29 Jan. 1992. This application relates to a multicellular honeycomb converter body along an axis of which fluid can flow through a plurality of channels. The honeycomb has at least two discs in axially spaced relation to each other. According to the specification, there is at least one bar type support near the axis by which the discs are connected together and mutually supported. The invention is said to make possible design of the first disc for fast heating up through hot exhaust gas passing through, or applied electrical current. The honeycomb body serves as a support for catalyst in the exhaust system of an internal combustion engine. Another reference is German Patent Application 4,102,890 A1 filed 31 Jan. 1991 and published 6 Aug. 1992. This application discloses a spirally wound corrugated and flat strips combination wherein the flat strip contains slots and perforations and is electrically heatable. The flat strips include a bridge between leading and trailing portions. Groups of strips are separated by insulation means. Another reference is U.S. Pat. No. 5,102,743 dated 7 Apr. 1992. This patent discloses a honeycomb catalyst carrier body of round, oval, or elliptical cross-section including a jacket tube and a stack of at least partially structured sheet metal layers intertwined in different directions in the jacket tube. The stack has a given length and a given width. At least one of the sheet metal layers has a greater thickness over at least a part of one of the dimensions than others of the layers. Such at least one layer is formed of thicker metal or of a plurality of identically structured metal sheets in contiguous relation.

A common problem with many of the prior devices has been their inability to survive severe automotive industry tests which are known as the Hot Shake Test and the Hot Cycling Test.

The Hot Shake test involves oscillating (100 to 200 Hertz and 28 to 60 G inertial loading) the device in a vertical attitude at a high temperature (between 800 and 950 degrees C.; 1472 to 1742 degrees F., respectively) with exhaust gas from a gas burner or a running internal combustion engine simultaneously passing through the device. If the device telescopes, or displays separation or folding over of the leading or upstream edges or the foil leaves, or shows other mechanical deformation or breakage up to a predetermined time, e.g., 5 to 200 hours, the device is said to fail the test.

The Hot Cycling Test is run with exhaust flowing at 800 to 950 degrees C. (1472 to 1742 degrees F.) and cycled to 120 to 150 degrees C. once every 10 to 20 minutes for 300 hours. Telescoping or separation of the leading edges of the thin metal foil strips, or mechanical deformation or breakage is considered a failure.

The Hot Shake Test and the Hot Cycling Test are hereinafter called "Hot Tests" and have proved very difficult to survive. The structures of the present invention will survive these Hot Tests.

In the following description, reference will be made to "ferritic" stainless steel. A suitable ferritic stainless steel is described in U.S. Pat. No. 4,414,023 dated 8 Nov. 1983 to Aggen. A specific ferritic stainless steel alloy useful herein contains 20% chromium, 5% aluminum, and from 0.002% to 0.05% of at least one rare earth metal selected from cerium, lanthanum, neodymium, yttrium, and praseodymium, or a mixture of two or more of such rare earth metals, balance iron and trace steel making impurities. A ferritic stainless steel is commercially available from Allegheny Ludlum Steel Co. under the trademark "Alfa IV."

Another stainless steel metal alloy especially useful herein is identified as Haynes 214 alloy which is commercially available. This alloy and other useful nickeliferous alloys are described in U.S. Pat. No. 4,671,931 dated 9 Jun. 1987 to Herchenroeder et el. These alloys are characterized by high resistance to oxidation and high temperatures. A specific example contains 75% nickel, 16% chromium, 4.5% aluminum, 3% iron, optionally trace amounts of one or more rare earth metals except yttrium, 0.05% carbon, and steel making impurities. Haynes 230 alloy, also useful herein has a composition containing 22% chromium, 14% tungsten, 2% molybdenum, 0.10% carbon, a trace amount of lanthanum, balance nickel.

The ferritic stainless steels, and the Haynes alloys 214 and 230, all of which are considered to be stainless steel, are examples of high temperature resistive, oxidation resistant (or corrosion resistant) metal alloys that are useful for use in making thin metal strips for the reinforcing webs hereof, as well as the multicellular honeycomb converter bodies, or monoliths, hereof. Suitable metal alloys must be able to withstand "high" temperatures, e.g., from 900 degrees C. to 1200 degrees C. (1652 degrees F. to 2012 degrees F.) over prolonged periods.

Other high temperature resistive, oxidation resistant metal alloys are known and may be used herein. For most applications, and particularly automotive applications, these alloys are used as "thin" metal strips or layers, that is, having a thickness of from about 0.001" to about 0.005", and preferably from 0.0015" to about 0.003".

BRIEF STATEMENT OF THE INVENTION

Briefly stated, the present invention is a reinforcing web for a multicellular honeycomb converter body having a plurality of thin metal strips, including at least one flat thin metal strip and at least one corrugated thin metal strip disposed in contiguous relation and physically joined together with a fused metal as by welding or brazing. These reinforcing webs should preferably be flexible along at least the longitudinal axis of the thin metal strips. One or more of the reinforcing webs hereof are interleafed or intertwined with alternating corrugated and flat thin metal strips or layers and S-wound, or spirally wound, about a central core or axis to form a reinforced multicellular honeycomb converter body and contained in a tubular housing.

In specific embodiments of this invention, the contacting line of the peaks or troughs of an corrugated thin metal strip are joined by fused metal to a flat thin metal strip. After joining the strips together, coating may be applied as, for example, by dipping. Suitable coatings are formed from washcoat application of a refractory metal oxide, e.g., alumina, or alumina/ceria, with or without a catalyst, followed by calcining. In a given reinforcing web, there may be one flat thin metal strip and one corrugated thin metal strip brazed together; two corrugated thin metal strips brazed one to each side of a flat thin metal strip; two corrugated thin metal strips of different amplitude, and two flat thin metal strips on the outside of the reinforcing web. The thin metal strips used in making the reinforcing webs hereof may also be precoated provided the brazing areas are masked or stripped of coating prior to brazing or welding.

BRIEF DESCRIPTION OF THE DRAWINGS

The invention may be better understood by having reference to the annexed drawings showing preferred embodiments of the present invention and wherein.

DETAILED DESCRIPTION OF THE INVENTION

As indicated above, the present invention relates to novel means for reinforcing a multicellular honeycomb converter core against failure in the Hot Tests described above. Basically, the reinforcing means comprises a reinforcing web formed of at least one corrugated thin metal strip having at least one flat thin metal strip secured to the apices or peaks of the corrugations. The web comprises a flat thin metal strip and a corrugated thin metal strip secured together as by a fused metal, e.g., a brazing or filler metal, or by welding. The reinforcing webs are conveniently made in advance of assembly and inserted into a group of thin metal strips which will form the spirally wound honeycomb core of a converter body. After layering of the thin metal strips to form a stack of alternating corrugated thin metal strips and flat thin metal strips along with one or more preformed reinforcing webs hereof centrally located in the stack, the stack is crushed in the middle with a suitable die tool to form a rigid central member, preferably with each layer welded or riveted to the next in the crushed region. This enables the assembly to be spirally wound, about the rigid member for encasing in a tubular retaining housing. The crushing step may be eliminated if the corrugated strips are previously made with a flat center portion.

Figure 1:
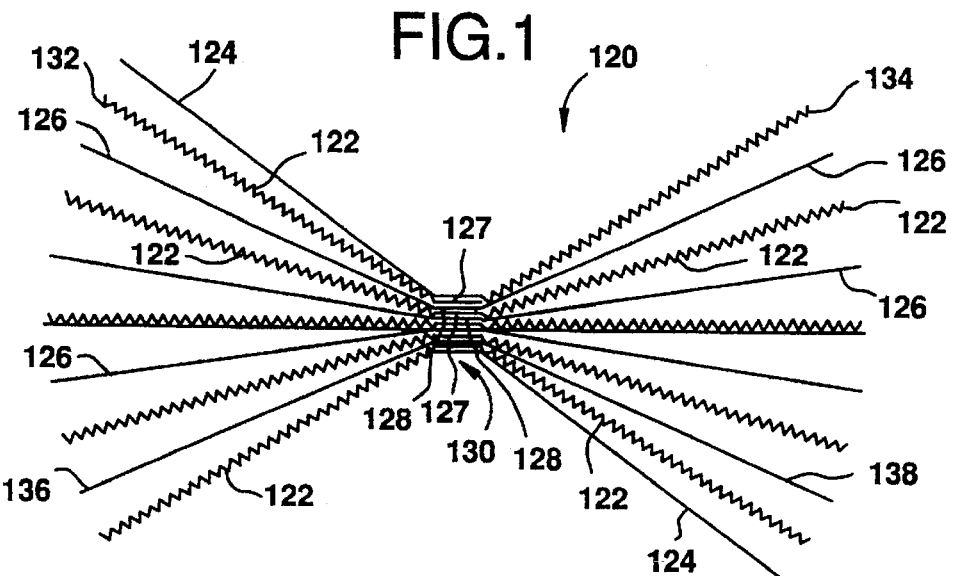
FIG. 1 is an end view of a stack of thin metal strips after crushing the central portion, and showing a reinforcing web located in the middle of the stack.

Referring now more particularly to FIG. 1, there is here shown a stack of thin metal strips, crushed in the center by a suitable die, and generally indicated by the numeral 120. This stack is composed of corrugated thin metal strips 122 and flat thin metal strips 124, 126. It should be noted that the flat strips 124 at the top and bottom of the stack are half length flat strips and are used for the purpose of preventing nesting of the left end of the upper corrugated strip 122, and preventing nesting of the right end of the lower corrugated strip 122 when those penultimate corrugated strips are brought into contact with each other on spirally winding the stack. The individual strips 122, 124 and 126, especially when used in engine exhaust applications, must be of high temperature resistive, oxidation resistant alloy, such as those mentioned above. The corrugated thin metal strips 122 each have a flattened central portion 127, and each of the flat thin metal strips 126 and 124 have a flat central portion, or a flat end portion 128. The group or stack 120 is gathered at the flat central portions 127 and 128 and connected together by mechanical means, e.g., stapling or riveting, or by means of a bifurcated pin, or by a fused metal as by brazing or welding. The flat central portions 127 and 128 of the layered strips 122, 124 and 126 are desirably about 3/16" to 1" wide as shown in FIG. 1. A suitable brazing paste is desirably applied in this area, after cleaning to remove any coating, to enable bonding of the layers together to form a rigid central member or region 130 about which the multicellular honeycomb converter core body may be spirally wound, or S-wound. The layers 122, 124 and 126 are desirably crushed together with a suitable die under a heavy load (one to five tons per square inch). Heat may be applied to braze or weld all the layers together in the central area 130. This unifies the stack 120 only in the center without the necessity for using a pin or rod. Ordinarily, it is desired for the corrugated thin metal sheets and the flat thin metal sheets to be treated by a process (see Cornelison et al U.S. Pat. No. 4,117,009, supra) which applies a coating of a refractory metal oxide, e.g., 75% gamma-alumina/25% ceria, prior to joining the several layers. There may be 6 to 12 or more such layers 122 and 126 with end layers 124 at each end of the stack 120. The coating must be removed in the central portions 127 and 128 by grit blasting or rotary wire brushing. The coating should also be removed at the distal ends of the thin metal sheets 122, 124 and 126 for about 1/8" to about 1/3" to enable brazing or welding of the thin metal strips to the housing, e.g., housing 22 in FIG. 2. As shown in FIG. 1, the individual thin metal strips 122 and 126 are continuous through the respective central portions 127 and 128, respectively, from one free end 132 to the free end 134 of the corrugated thin metal strips; and continuous from one free end 136 to the other free end 138 of the flat thin metal strips 126. The strips are generally from about 4" to about 24" long and from about 1" to about 8" wide.

The group of layered thin sheet metal strips of FIG. 1 is shown in expanded, uncoiled relation. The stack of FIG. 1 is gripped at the central portion with suitable legs or jaws, such as the legs of a bifurcated pin (not shown) and rotated in a clockwise manner, for example., until the thin metal strips are tightly wound in a spiraliform manner, whereby the thin metal strips 122 and 126, with half strips 124 on the outside, are brought into contiguous relation along their entire lengths. After winding and insertion in the tubular housing 22 (FIG. 2) the legs or jaws (or bifurcated pin) are removed. If the strips 122 and 126 are of equal length, the resulting configuration will be circular. If the strips 122 and 126 are of different lengths, or the flattened portions displaced from the center of the strip length, teen any oval or elliptical shape may be achieved as will be understood by those skilled in the art.

Figure 2:
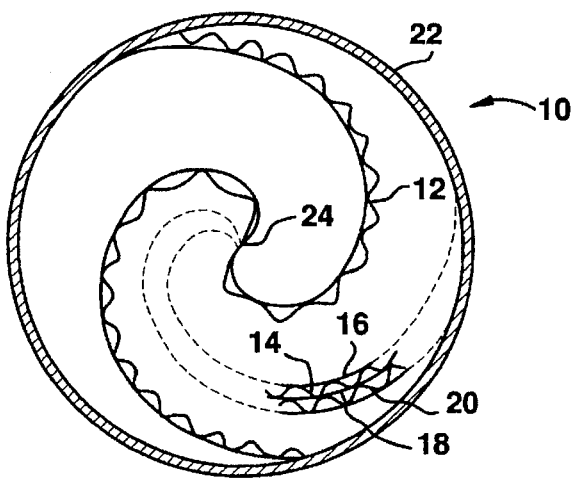
FIG. 2 is an end view of a multicellular honeycomb converter body in accordance herewith showing a reinforcing web in place in a spirally wound, multicellular honeycomb body contained in a tubular housing.

Referring to FIG. 2, there is here shown a multicellular honeycomb converter body 10 having an S-wound reinforcing web 12 along with a plurality of corrugated thin metal strips 14 and 20, and flat thin metal strips 16 and 18 which form the multicellular honeycomb body 10. The S-wound strips, e.g., 14, 16, 18, and 20, are tightly wound and retained within a retaining housing 22, or mantle 22, which, for example, is a tubular stainless steel member. As shown in FIG. 2, the central portion 24 of the reinforcing web 12 is flattened. This occurs when the stack of layered thin metal strips, such as shown in FIG. 3 is crushed in the center with a suitable die.

Figure 3:
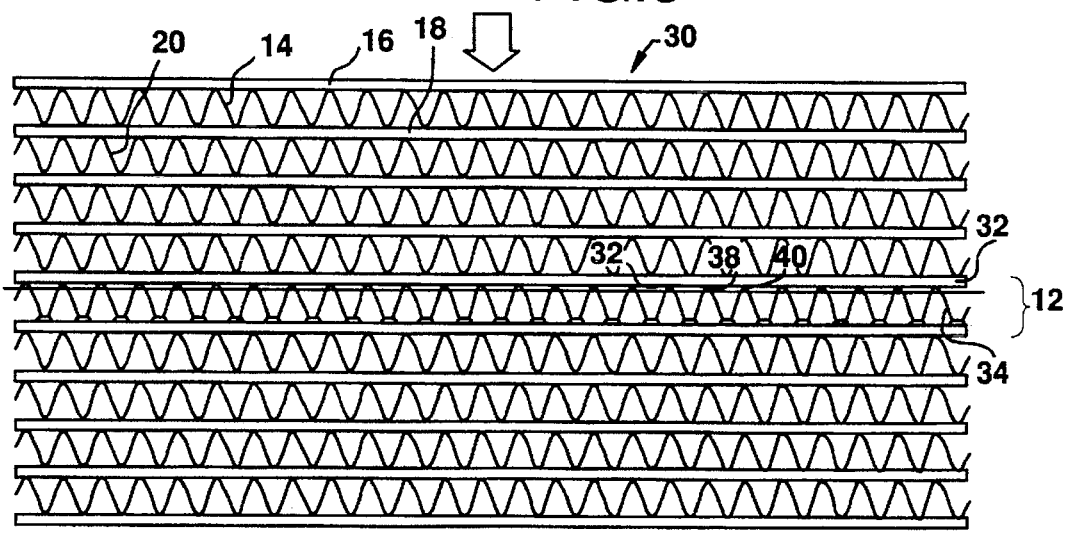
FIG. 3 is an end view, prior to crushing the central portion, of a stack of corrugated thin metal strips and alternating flat thin metal strips. The arrows indicate the point and direction of application of crushing force to the stack of thin metal strips. The crushing force is sufficient to virtually remove the corrugations. The central strip is a reinforcing web of the present invention. When the central portion is crushed, as shown in FIG. 1, and the individual sheets or layers brazed or welded together in the crushed region, there is formed a rigid bar about which the layered thin metal strips are S-wound, or spirally wound, prior to encasing in a tubular housing to form a multicellular honeycomb converter body.

FIG. 3 shows a stack of thin metal strips generally indicated at 30 and composed of alternating flat thin metal strips 16 and 18 and corrugated thin metal strips 14 and 20. In the middle of the stack 30, there is located a reinforcing web 12 in laid out condition prior to crushing and prior to S-winding. The reinforcing web 12 is composed of a flat thin metal strip 32, and a corrugated thin metal strip 34. The apices 38 and 40, for example, of the corrugated thin metal strip 34 are secured to the flat thin metal strip 32 by fused metal, e.g., as by welding or by brazing with a brazing paste. When the stack 30 is crushed between the jaws of a suitable die, there is formed a rigid member 130 (FIG. 1) such as .clearly shown in commonly owned copending application Ser. No. 08/066,887 filed 25 May 1993 by William A. Whittenberger entitled "Combined Electrically Heatable Converter Body". The rigid central member at 130 forms an axis about which the core is S-wound.

Figure 4:
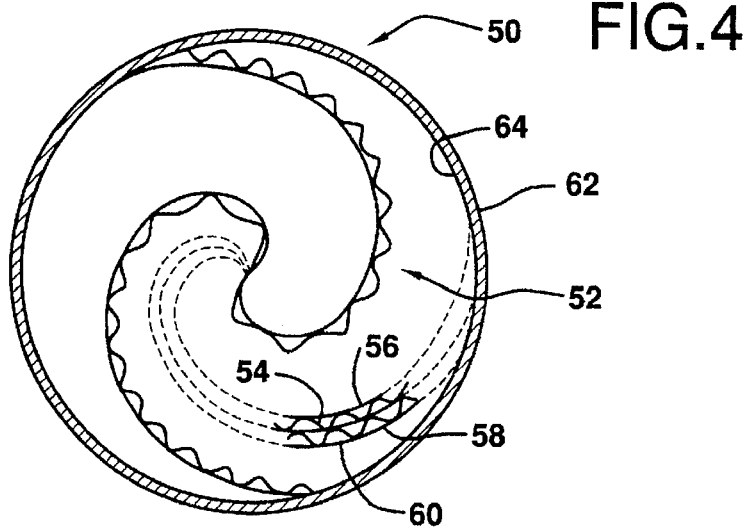
FIG. 4 is an end view of a converter body in accordance herewith showing a brazing strip around the inside of the tubular housing for securing the free ends of the corrugated thin metal strips and the flat thin metal strips to the housing.

FIG. 4 shows a multicellular honeycomb converter body generally indicated at 50 having a reinforcing web in accordance herewith generally indicated at 52, with multicellular honeycomb-forming typical corrugated thin metal strips 54 and 58, in alternating relation with flat thin metal strips 56 and 60. FIG. 4 shows a preferred mode of attaching the free ends of the cell or honeycomb matrix forming strips 54, 56, 58 and 60, for example, to the retaining housing 62. To this end, a thin brazing foil sheet 64 is placed around the inner periphery of the retaining housing 62, or mantle 62. The tightly S-wound group of thin metal strips is inserted into the lined housing 62 and allowed to expand to the inner periphery of the lined housing 62. The core body is then induction heated to fuse the brazing foil sheet 64, and upon cooling to thereby secure the distal ends of the thin metal strips 54, 56, 58 and 60, including the ends of the reinforcing web 52, to the inner periphery of the retainer housing 62.

Figure 5:
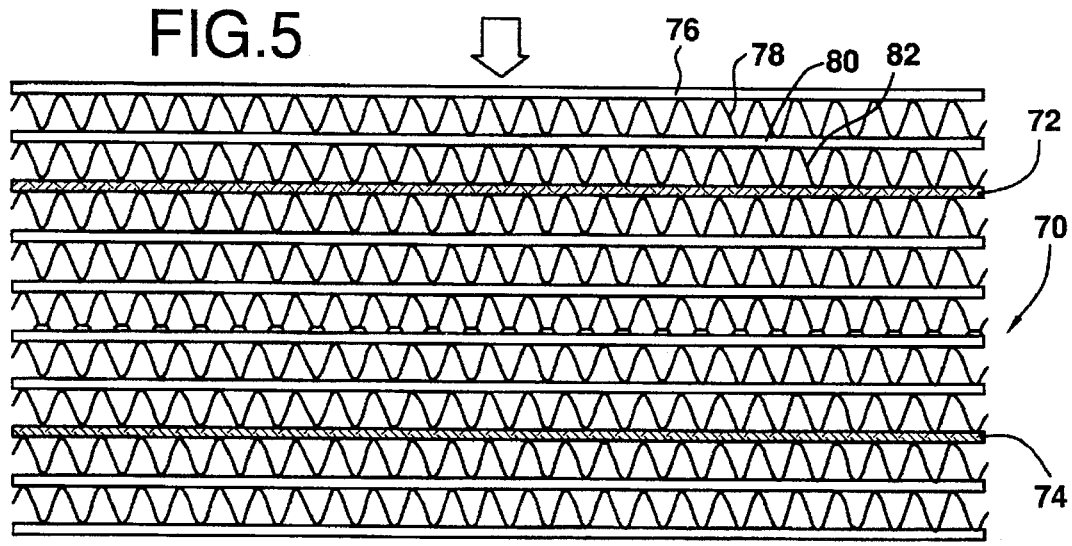
FIG. 5 is a view like FIG. 2 prior to crushing the central portion showing a series of corrugated thin metal strips alternating with flat thin metal strips and having stronger alloy flat thin metal strips located within the multicellular converter body for additional reinforcing.

FIG. 5 shows another stacking arrangement like FIG. 3. Here, however, the reinforcing web, generally indicated at 70, is augmented by additional strengthening flat strips 72 and 74 formed of a stronger alloy. For example, where the thin metal strips 76, 78, 80, and 82 are made of ferritic stainless steel, the augmenting flat thin metal strips 72 and 74 may be made of Haynes 214 alloy or Haynes 230 alloy. The latter alloys are considerably stronger than the ferritic stainless steel and serve to augment the reinforcing effect of the reinforcing web 70.

Figure 6:
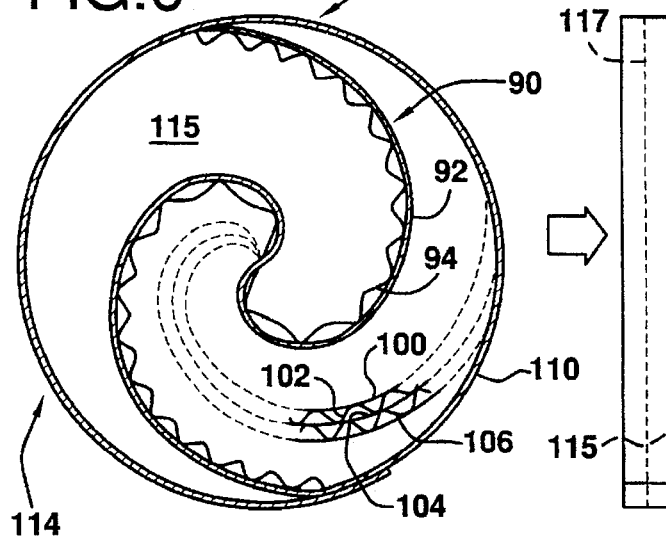
FIG. 6 is an end view of a converter body in accordance herewith showing elongated flat thin metal strips of sufficient length to form the retaining housing by wrapping around the outer periphery of the spirally thin metal strips.

FIG. 6 shows in end view, a modification of the present invention wherein the reinforcing web 90 is formed of a flat thin metal strip 92, and a corrugated thin metal strip 94 brazed together to form an integral or composite web 90. In this case, however, the flat thin metal strip 92 has an extra long tail 110 which is long enough to be wrapped about the tightly wrapped bundle of the thin metal strips, e.g., e.g., strips 100, 102, 104, and 106 forming the honeycomb core 115. The tail 110 forms a retaining housing 114 about the converter body of FIG. 6. The multicellular honeycomb converter core body is indicated by the numeral 114 and includes the honeycomb core 115. This is not a preferred embodiment because of difficulty in manufacturing and cost.

Figure 7:
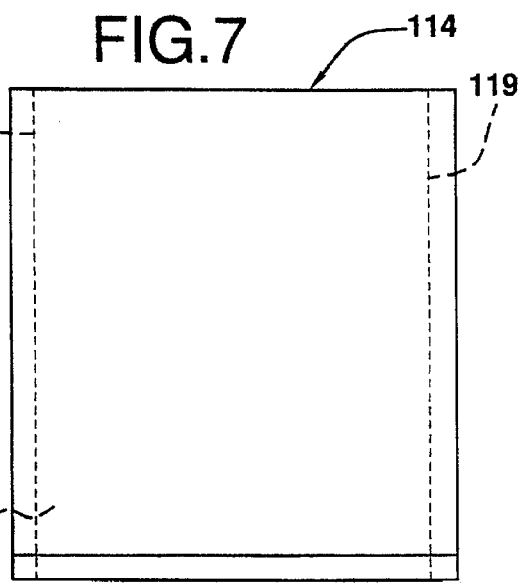
FIG. 7 is a side elevation of the core body shown in FIG. 6 with the direction of gas flow shown.

FIG. 7 is a side elevation of the core body of FIG. 6 showing the direction of gas, or fluid, flow from the inlet or upstream end 117 to the outlet or downstream end 119 of the honeycomb core 115.

Figure 8:
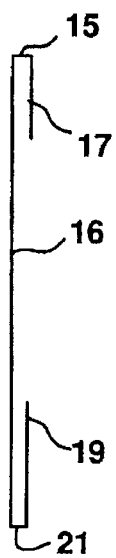
FIG. 8 is an end view of a flat thin metal strip showing reinforcing folded over edges for strengthening the strip.

Further strengthening of the core elements in an axial direction may be achieved by providing a folded over portion along the leading edge of the thin metal foil strips, and also, preferably, along the trailing edge of the thin metal strips, for both the flat strips 16 and the corrugated strips 14. The "leading edge" is the upstream edge of the thin metal strip which is first contacted by incoming exhaust gas, for example, and the trailing edge is the downstream or last edge to be contacted by the gas as it leaves the converter body. FIG. 8 shows an end view of a folded over flat strip 16 having folded over portions 17 and 19 at the leading edge 15 and at the trailing edge 21, respectively. These "hems" are rolled so that the thickness of the strip, e.g., strip 16, is doubled. In a strip 3.5" wide, for example, the folded over portion, or "hem" may be 0.25" to 0.75" wide. An end view of a typical flat thin metal strip 16 is shown in FIG. 8.

Figure 9:
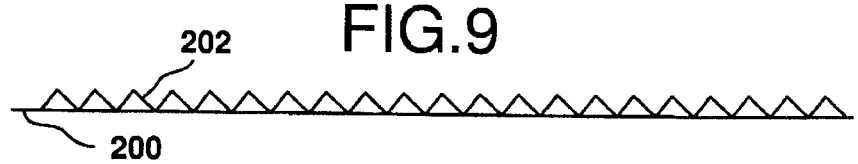
FIG. 9 is a side view of a reinforcing web in accordance herewith showing a corrugated thin metal strip superimposed on and secured to a flat thin metal strip.

FIGS. 9–13 show various embodiments of the reinforcing webs of the present invention. FIG. 9 shows a preferred reinforcing web structure hereof having a single flat thin metal sheet 200 with a single corrugated thin metal sheet 202 secured as by brazing or welding, to the upper surface of the flat thin metal sheet 200.

Figure 10:
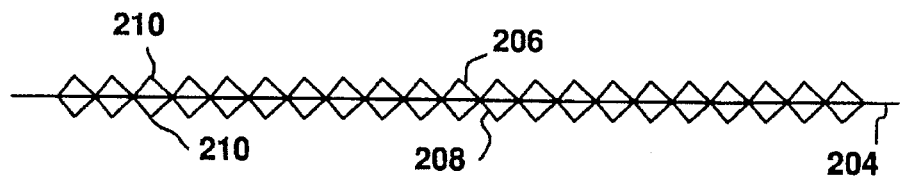
FIG. 10 is a side view of another reinforcing web in accordance herewith showing a flat thin metal strip located between two corrugated thin metal strips with the peaks or crests of the corrugations of one corrugated sheet opposite the peaks or crests of the corrugations of the opposite corrugated thin metal strip. All three strips are bonded together at the crests or peaks.

FIG. 10 shows in side view another embodiment of the invention formed of a flat thin metal sheet 204 having secured to each side thereof corrugated thin metal sheets, or strips 206 and 208, respectively. Here the peaks, or crests, of the corrugations 210 and 212 are directly opposed to each other, or in synchronism.

Figure 11:
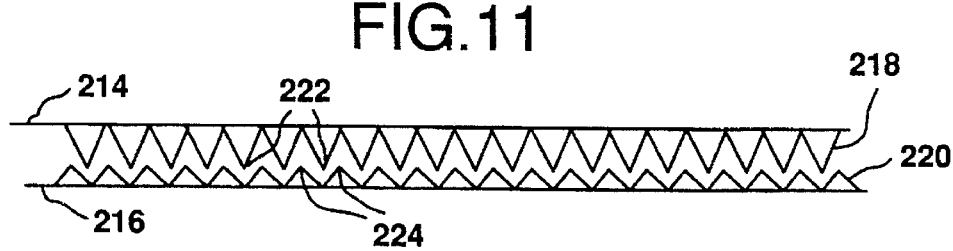
FIG. 11 is a side view of another reinforcing web in accordance herewith formed from two outer flat thin metal strips and two contiguous corrugated thin metal strips in face-to-face relation having a different amplitude, but the same pitch, for the corrugations of each strip. The confronting corrugated thin metal strips are not brazed together.

FIG. 11 shows still another embodiment in side view formed of two flat thin metal sheets or strips 214 and 216, and two corrugated thin metal strips 218 and 220 of different amplitude, albeit the same pitch. While the corrugated thin metal strips 218 and 220, respectively, are brazed or otherwise secured to the flat thin metal strips 214 and 216, respectively, the confronting surfaces of the corrugated thin metal strips 218 and 220 are not attached to each other, i.e., one corrugated/flat combination, e.g., 214/218, is free to move relative to the other corrugated/flat combination, e.g., 220/216. The apices 222 of the corrugated upper thin metal strip 218 are located and dimensioned to fit into the valleys 224 of the lower thin metal strip 220 and are free to move over a limited range therein.

Figure 12:
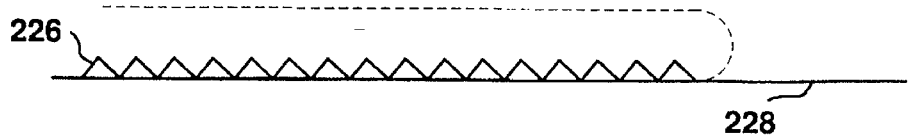
FIG. 12 is a side view of a different form of reinforcing web in accordance herewith wherein a corrugated thin metal strip has one half the length of the flat thin metal strip to which it is secured, and the flat thin metal strip is folded back onto the upper surface of the corrugated thin metal strip.

FIG. 12 shows another form of reinforcing web in accordance herewith. Here, a corrugated half-sheet 226 is secured to a flat thin metal sheet 228 in the manner shown, and the balance of the flat thin metal sheet 228 folded back over the upper surface of the corrugated half-sheet 226, but not brazed or otherwise secured thereto. These half-sheets may be used as the divider sheets to prevent nesting of the penultimate corrugated sheets when the stack is spirally wound.

Figure 13:
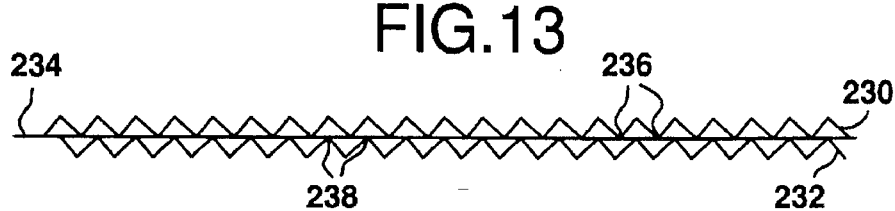
FIG. 13 shows a modification of the form shown in FIG. 10 wherein the peaks or crests of the corrugations of the upper thin metal sheet are out of synchronism with the crests of the corrugations of the lower thin metal sheet.

FIG. 13 shows a modification of the form shown in FIG. 10 and formed of two corrugated thin metal sheets or strips 230 and 232 secured to each side of a flat thin metal sheet 234. However, the apices of the corrugations 236 of the upper corrugated thin metal sheet 230 are out of synchronism with the apices 238 of the lower corrugated thin metal sheet 232.

Figure 14:
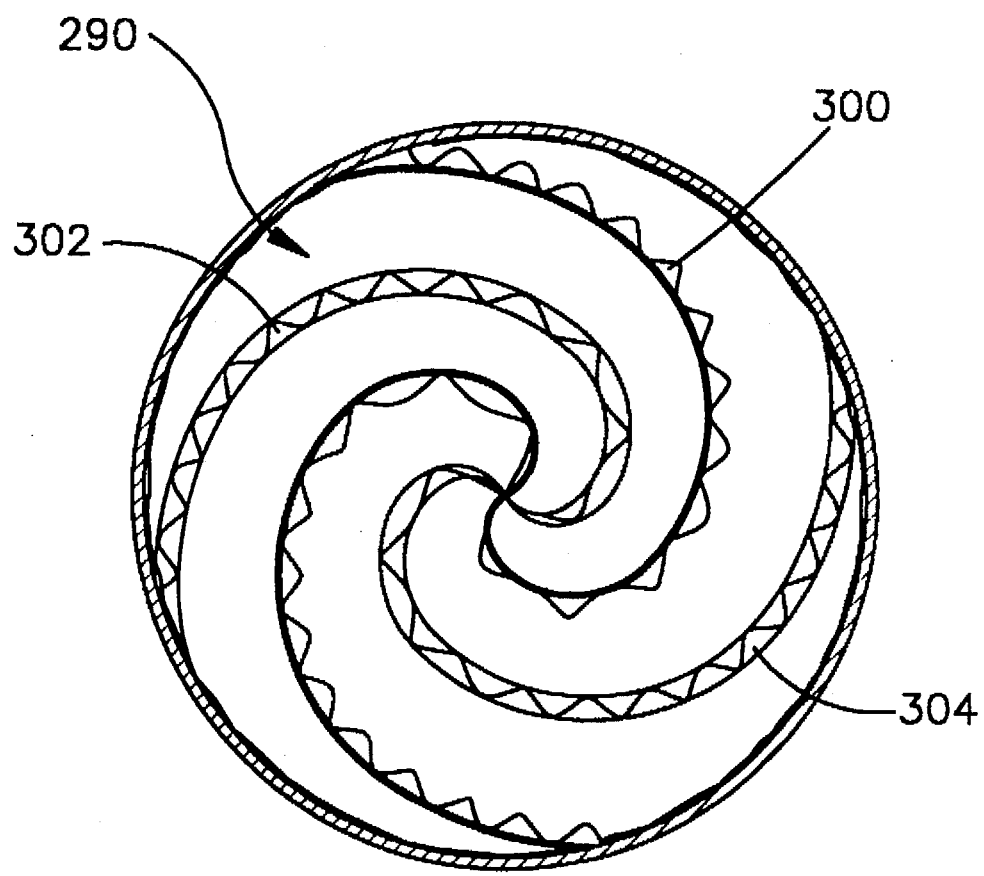
FIG. 14 is an end view of multicellular honeycomb converter body showing the use of a reinforcing web like that shown in FIG. 9 and two half reinforcing webs such as shown in FIG. 12 at each end of the stack.

FIG. 14 is an end view of a multicellular honeycomb converter core body 290 showing the use of a reinforcing web 300 like that shown in FIG. 9, and two half reinforcing webs 302 and 304 such as shown in FIG. 12. The stack from which the structure of the core body 290 is formed is the same as that shown in FIG. 1 with the exception that the top and bottom half-sheets 124 have been replaced with the half-reinforcing webs 302 and 304 of FIG. 12.

The corrugations in FIGS. 9–13 have, for convenience, been shown as triangular corrugations. It will be understood that the corrugations are preferably equilateral-triangular in cross-sectional configuration with rounded apices and bends to avoid stress. The corrugations may be sinusoidal in cross-sectional configuration or any other suitable corrugation form.

The reinforcing webs of the present intention are of thin high temperature resistive, oxidation (or corrosion) resistant stainless steel metal alloys such as those mentioned above. The corrugations in the corrugated thin metal strips are preferably straight-through as distinct from herringbone or chevron, that is, they desirably have no bends or direction changes intermediate their ends, running instead in a straight line directly from one longitudinal edge of the metal strip to the other. Generally, for minimum back-pressure, the corrugations are normal to the parallel marginal edges of the thin metal strip, although, if a slight increase in back-pressure can be tolerated, the corrugations may be canted from about 3 to about 15 degrees to a line normal or perpendicular to the longitudinal marginal edges to provide better contact efficiency. The corrugations have an amplitude of from about 0.02" to about 0.15" and a pitch of from about 0.03" to about 0.2". The cell density is generally in the range of from 40 to 800 cells per square in (cpsi), e.g., 150 cpsi. Corrugations having a herringbone or chevron pattern may be used if desired.

The reinforcing webs of the present invention are quite resistant to torsional twisting although flexible enough to be spirally wound or S-wound along with the other thin metal strips to form the multicellular honeycomb converter bodies hereof.

As indicated above, the thin metal strips forming the balance of the honeycomb converter body i.e., those other than the aforementioned reinforcing web may be precoated on one or both sides with the same or different coatings, or not coated, and with or without a catalyst as desired. The coating may be a refractory metal oxide coating formed from a washcoat of gamma-alumina, gamma-alumina/ceria, ceria, zirconia, titania, titania/alumina, titania/ceria, silica, vanadia, titania/vanadia, zeolite etc. Also, the refractory metal oxide coating may have a noble metal catalyst deposited thereon, e.g., palladium, platinum, rhodium, ruthenium, indium, or a mixture of two or more of such noble metals. For a process for forming precoated thin metal strips, see U.S. Pat. No. 4,711,009 to Cornelison et al, supra. Catalyzed devices are especially useful in treating the exhaust gases of internal combustion engines to remove pollutant materials contained therein. The thin metal strips used in forming the reinforcing webs of the present invention are desirably similarly coated after brazing or welding, as the coating will generally interfere with the brazing or welding operation. The multicellular honeycomb portions of the converter bodies hereof are desirably precoated with a refractory metal oxide coating, with or without a catalyst overlaid thereon.

The converter bodies hereof are conveniently used in conjunction with electrically heatable converter units placed in the exhaust line ahead of the converters hereof. In this position, the converters become what is known in the art as a "light-off" converter wherein a reaction initiated in the electrically heatable unit, e.g., oxidation, is carried further. Also desirably contained in the exhaust line is a main catalytic converter which is normally a conventional catalytic converter, such as a ceramic core converter. Here, conversion of pollutant materials in the exhaust is carried to the point where the pollutant content of the exhaust gas is reduced to acceptable limits for discharge to the atmosphere.

The reinforcing webs of the present invention may also be used in "integral" catalytic converter devices wherein at least a portion of certain of the thin metal layers or strips are electrically heatable and the balance of the thin metal layers are not. The electrically heatable thin metal layers are intertwined with and overlap the non-electrically heatable thin metal layers, thus, the term "integral". The unheated portion forms a "light-off" portion of the converter body, and both portions are contained in the same housing. Reference may be had to the commonly owned application of Woodruff et al Ser. No. 08/322,258 filed 13 Oct. 1994 for a disclosure of integral catalytic converter devices in which the reinforcing webs of the present invention may be used.

Throughout the foregoing specification, reference has been made to "flat" thin metal strips. It has been found that the provision of a very small corrugation, e.g., 0.005" amplitude and a pitch of 0.02" to 0.3" on the "flat" thin metal strips aids in the processing of the flat thin metal strips through the coating equipment. Thus, where the term "flat" is used herein, it will be understood to mean either uncorrugated flat thin metal strips, or very slightly corrugated flat thin metal strips.

What is claimed is:

1. A multicellular honeycomb converter body comprising (a) a tubular housing; (b) a plurality of corrugated thin metal strips, said corrugated thin metal strips having corrugations defined by peaks and valleys, (c) a plurality of flat thin metal strips, said flat thin metal strips and said corrugated thin metal strips being in alternating relation forming a stack, said stack being spirally wound and contained in said tubular housing, said corrugated thin metal strips and said flat thin metal strips being precoated with a refractory metal oxide coating, and (d) at least one spirally wound reinforcing web within said stack comprising at least one flat thin metal strip having free distal ends and at least one corrugated thin metal strip having free distal ends and having peaks and valleys, and said at least one flat thin metal strip and said at least one corrugated thin metal strip being free of refractory metal oxide coating, said at least one corrugated thin metal strip being one half the length of said at least one flat thin metal strip and said at least one flat thin metal strip being reversed folded over said at least one corrugated thin metal strip, and said at least one flat thin metal strip and said at least one corrugated thin metal strip of said at least one reinforcing web being disposed in contiguous relation and physically joined to each other by fused metal along the lines of contact, and said reinforcing web having a central portion.

2. A multicellular honeycomb converter body as defined in claim 1 wherein the central portion of reinforcing web is crushed to minimum thickness.

3. A multicellular honeycomb converter body as defined in claim 1 wherein all corrugations are straight-through.

4. A multicellular honeycomb converter body as defined in claim 1 wherein the free distal ends of said reinforcing web corrugated and flat strips are joined to said housing.

5. A multicellular honeycomb converter body as defined in claim 1 wherein the reinforcing web includes one corrugated thin metal strip free of refractory metal oxide coating superimposed on and secured to one flat thin metal strip free of refractory metal oxide coating.

6. A multicellular honeycomb converter body as defined in claim 1 wherein the reinforcing web includes a corrugated thin metal strip free of refractory metal oxide coating superimposed on and secured to each side of a flat thin metal strip free of refractory metal oxide coating.

7. A multicellular honeycomb converter body as defined in claim 1 wherein the refractory metal oxide coating includes alumina.

8. A multicellular honeycomb converter body as defined in claim 1 wherein the refractory metal oxide coating is an alumina/ceria coating.

9. A multicellular honeycomb converter body as defined in claim 1 wherein the refractory metal oxide coating is a zeolite.

10. A multicellular honeycomb converter body as defined in claim 1 wherein the precoated flat and corrugated thin metal strips include a catalyst supported thereon.

11. A multicellular honeycomb converter body as defined in claim 10 wherein the catalyst is a noble metal catalyst.

12. A multicellular honeycomb converter body as defined in in claim 11 wherein the noble metal catalyst is selected from the group consisting of platinum, palladium, ruthenium, indium, rhodium, and mixtures of two or more of such metals.

13. A multicellular honeycomb converter body as defined in claim 6 wherein in the web the peaks of the corrugations of the corrugated thin metal strip on one side of the flat thin metal strip are directly opposite the peaks of the corrugations on the corrugated thin metal strip on the other side of the flat thin metal strip.

14. A multicellular honeycomb converter body as defined in in claim 6 wherein in the web the peaks of the corrugations of the corrugated thin metal strip on one side of the flat thin metal strip are opposite the valleys of the corrugations of the corrugated thin metal strip on the other side of the flat thin metal strip.

15. A multicellular honeycomb converter body comprising (a) a tubular housing; (b) a stack of corrugated thin metal strips of predetermined length and flat thin metal strips of substantially the same predetermined length, said corrugated and flat thin metal strips being precoated with a refractory metal oxide coating, said stack having a top and a bottom end, said corrugated and flat strips being in alternating relation, said stack being crushed to form a rigid centrally located crushed portion; (c) a first reinforcing web within said stack comprising a flat thin metal strip and a corrugated thin metal strip, said flat thin metal strip and said corrugated thin metal strip of said first reinforcing web being free of refractory metal oxide coating and in contiguous relation and secured together along the lines of contact; (d) second and third reinforcing webs at each of said top and bottom ends of the stack, each second and third reinforcing web comprising a corrugated thin metal strip having approximately one half said predetermined length and a flat thin metal strip having said predetermined length and being in contiguous superimposed secured relation to each other with a portion of the flat strip of each second and third reinforcing web being uncovered, the uncovered portion of said flat thin metal strip reverse folded over the corrugated thin metal strip of each second and third reinforcing web, said corrugated and flat thin metal strips of each second and third reinforcing web being free of refractory metal oxide coating; and (e) said stack being spirally wound about said rigid crushed portion and contained in said tubular housing.

* * * * *